T. W. ATTERBURY & P. W. MATTHEWS.
ROTARY GRATE.
APPLICATION FILED NOV. 10, 1915.
1,207,358.
Patented Dec. 5, 1916.
4 SHEETS—SHEET 1.
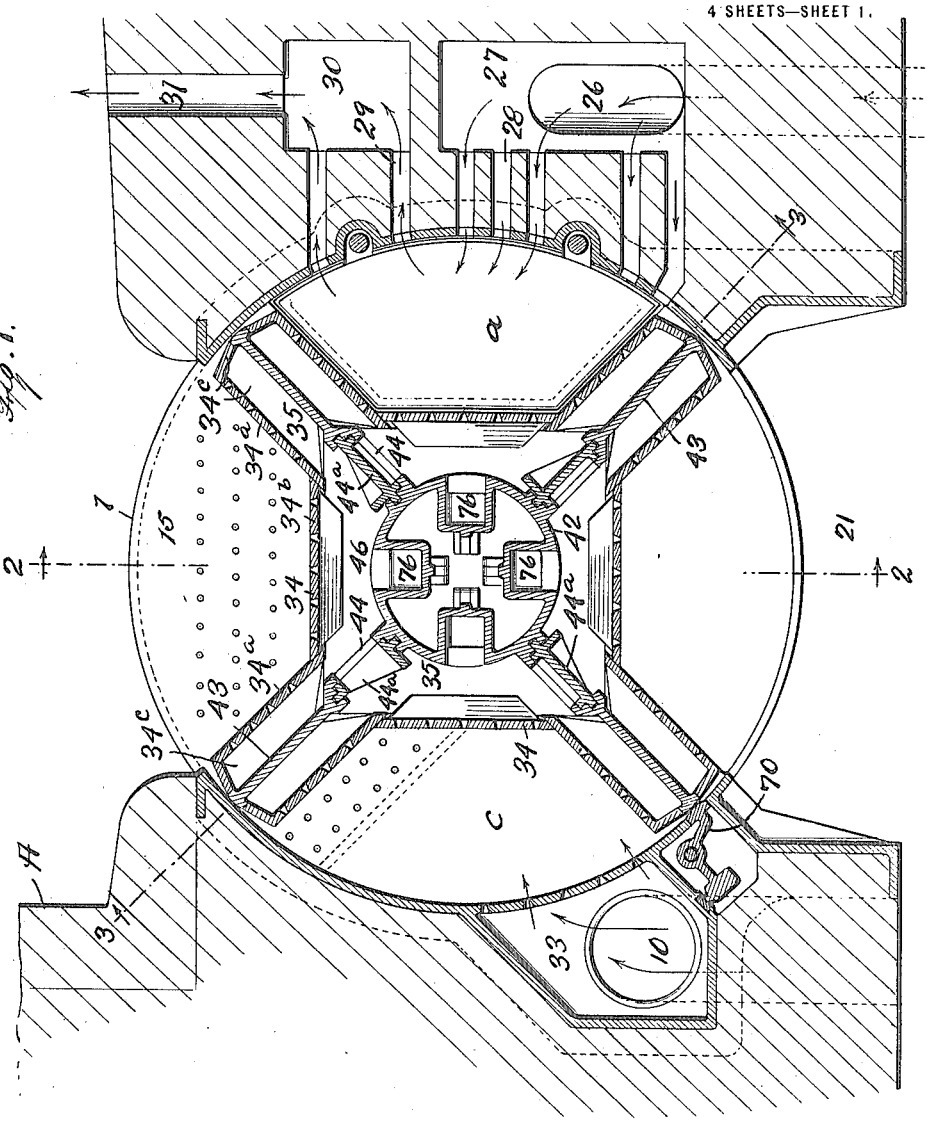
WITNESS
INVENTORS
Thomas W. Atterbury
Percy W. Matthews
BY
ATTORNEY

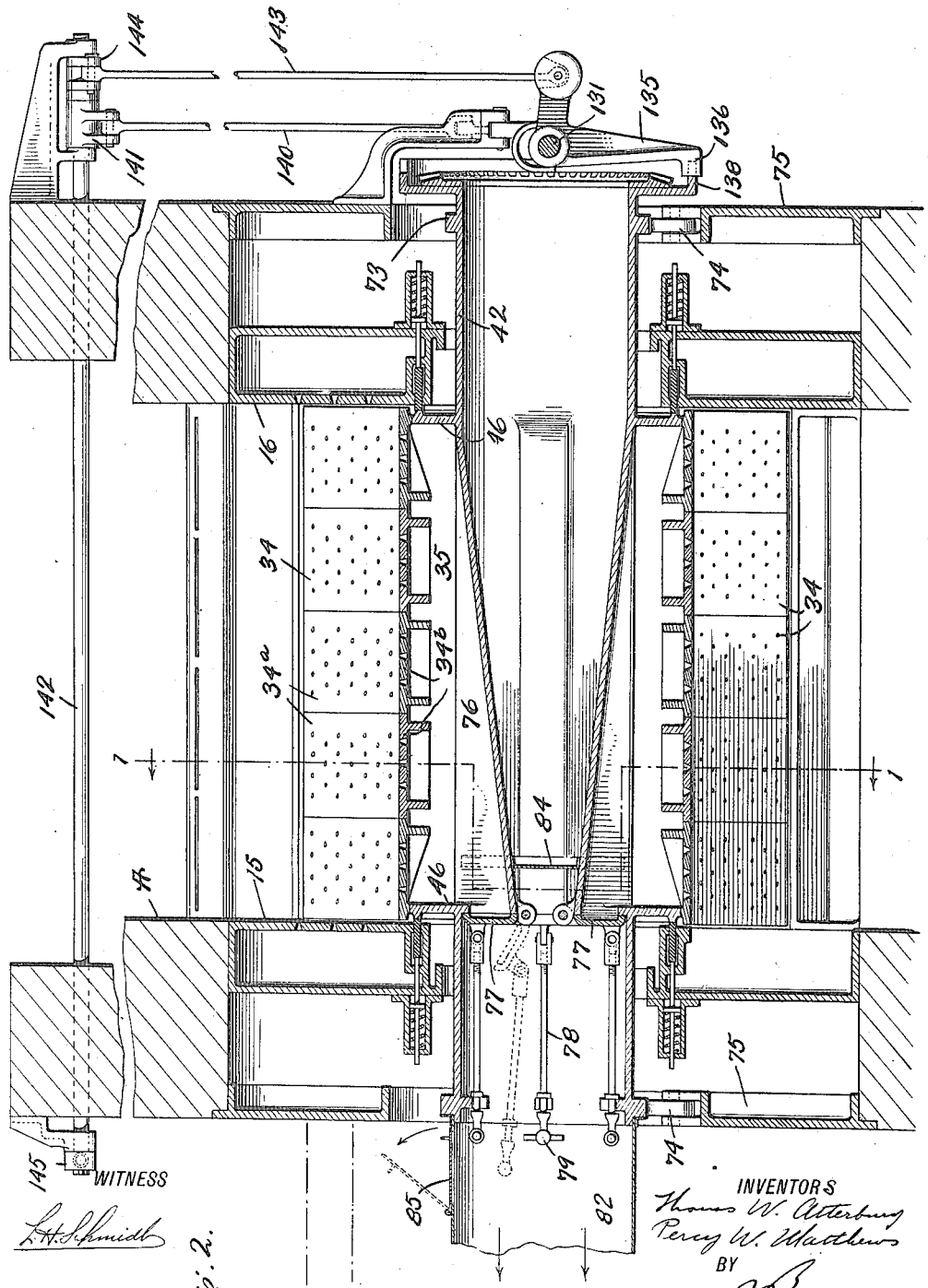

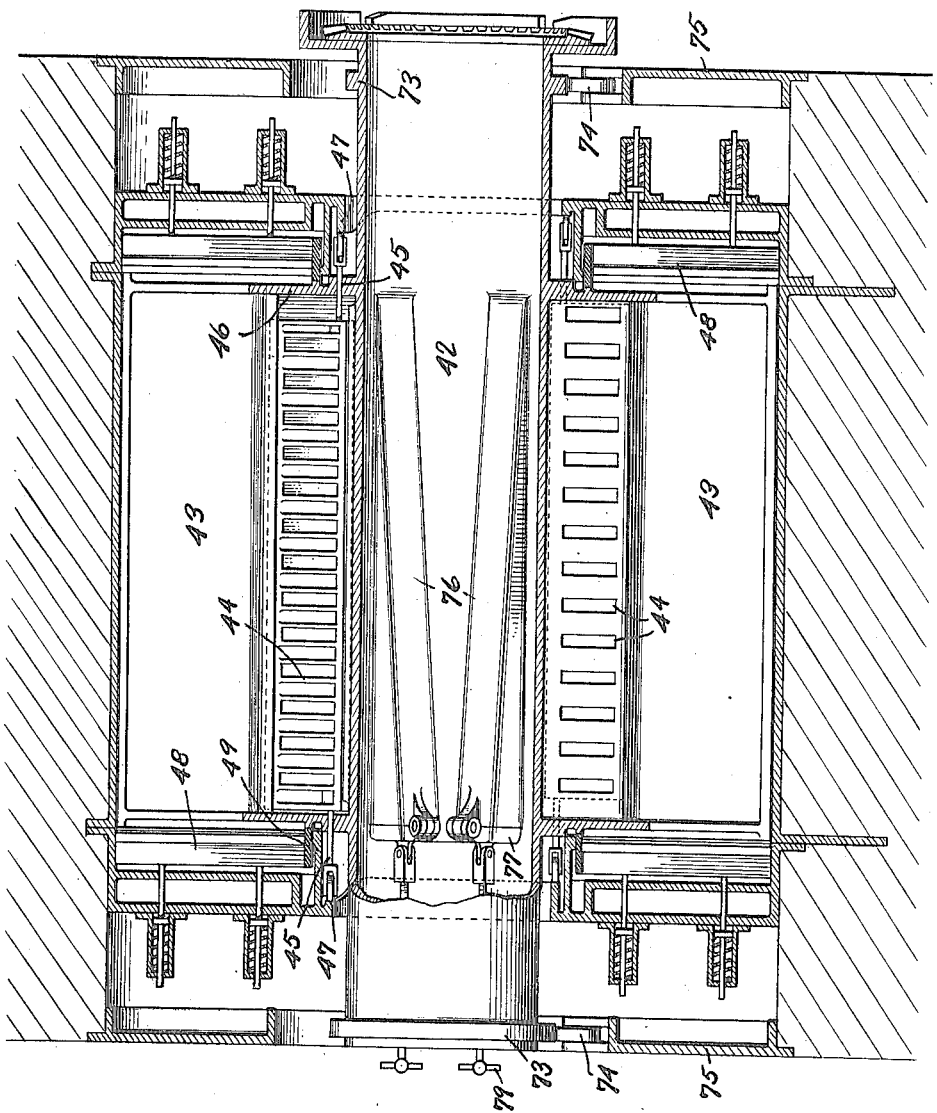

T. W. ATTERBURY & P. W. MATTHEWS.
ROTARY GRATE.
APPLICATION FILED NOV. 10, 1915.
1,207,358.
Patented Dec. 5, 1916.
4 SHEETS—SHEET 4.
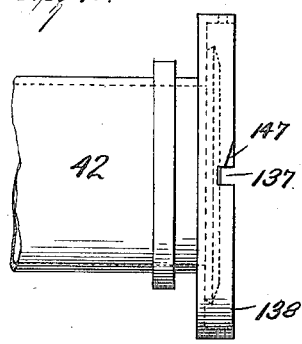
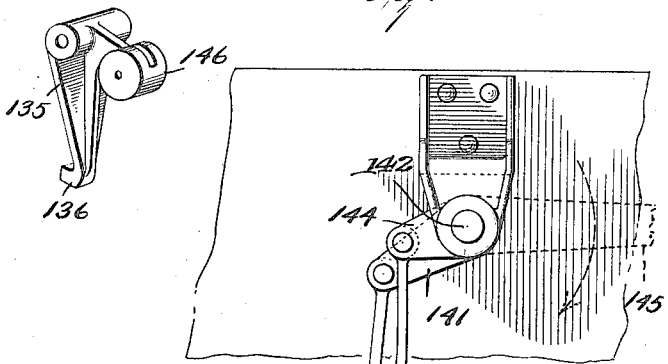
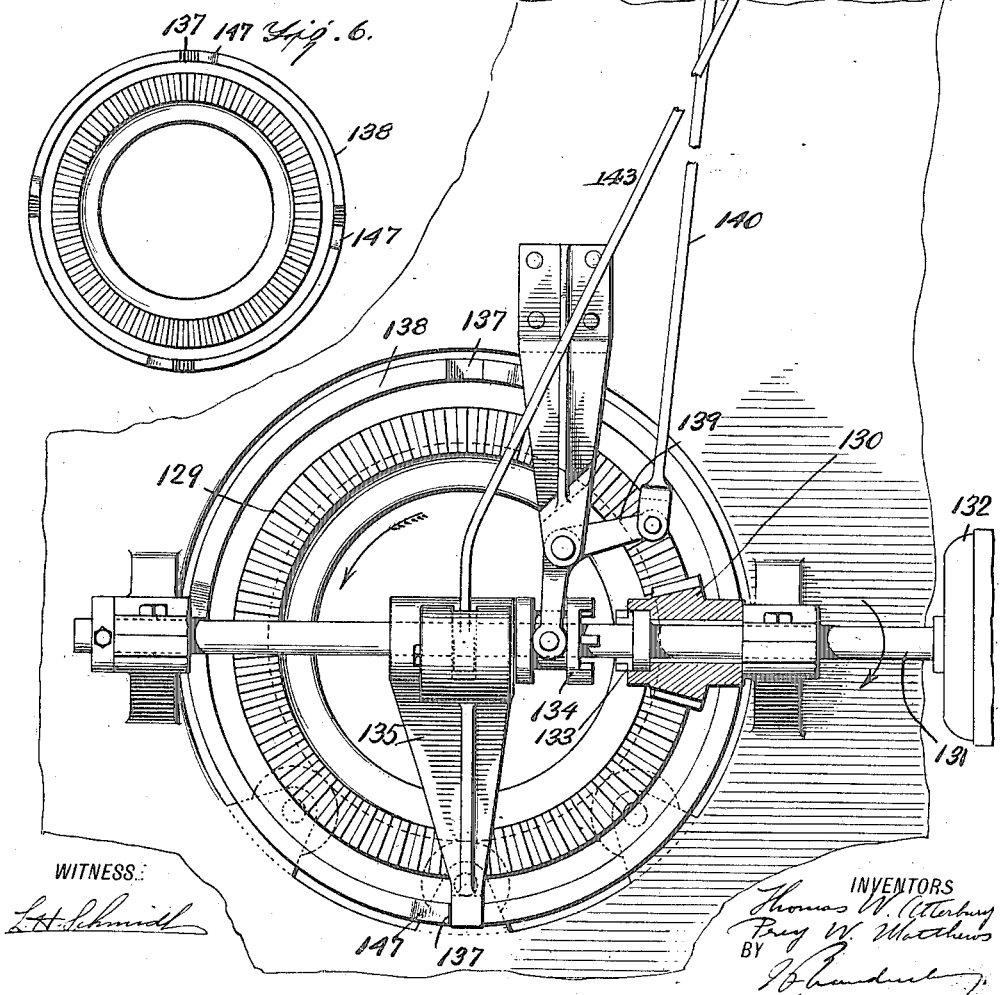

UNITED STATES PATENT OFFICE.

THOMAS W. ATTERBURY, OF DANSVILLE, NEW YORK, AND PERCY W. MATTHEWS, OF SCOTTDALE, PENNSYLVANIA, ASSIGNORS, BY DIRECT AND MESNE ASSIGNMENTS, OF FIVE-TWELFTHS TO SAID MATTHEWS, FIVE-TWELFTHS TO FREDERICK EMMET BEDALE, OF SCOTTDALE, PENNSYLVANIA, AND ONE-SIXTH TO JOSEPH FRANKLIN BRANDENBURG, OF MAHWAH, NEW JERSEY.

ROTARY GRATE.

1,207,358.      Specification of Letters Patent.      Patented Dec. 5, 1916.

Original application filed July 5, 1912, Serial No. 707,697. Divided and this application filed November 10, 1915. Serial No. 60,761.

*To all whom it may concern:*

Be it known that we, THOMAS W. ATTERBURY and PERCY W. MATTHEWS, subjects of the King of Great Britain and residents, respectively, of Dansville, in the county of Livingston and State of New York, and Scottdale, in the county of Westmoreland and State of Pennsylvania, have invented certain new and useful Improvements in Rotary Grates, of which the following is a specification.

The object of the invention is to provide a practical and efficient rotary grate for furnaces and the like, and also to provide advantageous driving means for advancing the grate predetermined distances at intervals.

The grate is mounted to rotate about a horizontal axis and is divided into a series of grate compartments or sections, which are walled off from each other and provided with means, such as automatic valves, for opening and closing draft communication between the compartments at desired times. The grate body is preferably in the form of a central drum or hollow hub having outward projecting wings constituting divisions between compartments, wherein grate bars are placed in such manner as to form receptacles or grate units, the perforated walls of which are spaced by an air chamber from the draft-intercepting walls of the compartments, which latter have air ports controlled by the valves just mentioned. Ash pockets formed in the walls of the central drum at the bottoms of the compartments enable accumulations to be removed from the draft spaces through the center of the grate.

The means for turning the grate at intervals comprises a suitable motor or source of power, with a clutch connection between the same and the grate and means for automatically disconnecting the clutch and arresting the grate after a predetermined movement.

These and other features of the invention will become apparent as the specification proceeds and will be more particularly pointed out in the appended claims.

In the accompanying drawings: Figure 1 is a vertical cross-section through the grate, taken on the line 1—1 of Fig. 2; Fig. 2 is a vertical longitudinal section through the grate on the line 2—2 of Fig. 1; Fig. 3 is a longitudinal section on the line 3—3 of Fig. 1; Fig. 4 is a fragmentary end or front elevation showing the driving mechanism; Fig. 5 is a fragmentary side elevation of the end portion of the drum engaged by the driving mechanism; Fig. 6 is a face view of Fig. 5; and Fig. 7 is a detail perspective view showing a detent for arresting the movement of the grate.

The central drum or hollow hub of the grate is designated 42 and its radiating wing walls 43. The walls of the grate compartments thus formed are solid, for the purpose of controlling the draft within the grate, and communication between the compartments may be established and cut off in an appropriate manner by means of valves or damper slides $44^a$ which are adapted to open and close ports 44, which in this instance are formed in the inner portions of the wing walls 43. These valves may be adapted for automatic operation at predetermined points in the revolution by means of rods 45 projecting from their opposite ends and stationary cam tracks or guides 47 engaged by rollers on the ends of the said rods.

Within the several compartments are box-like receptacles or grate units 34, formed by perforated side and bottom grate bars $34^a$ and $34^b$, which are suitably held in positions spaced from the wings and drum so as to provide draft chambers 35 between the perforated walls and the solid valved walls of the compartments. The said grate units are open at the top or periphery, and may also be open at the ends, where the charges can be retained by side casings 15, 16. Suitable means, such as flanges $34^c$ on the side grate bars and flanges 46 on the drum, are provided at the ends and periphery of the grate in order to close the draft spaces against escape of air at these regions. The valved ports 44 constitute means of communication between the several air spaces 35, whereby, for example, forced or induced draft may be admitted to one of the compartments and, after passing through the material therein, caused to enter the air space of an adjoining compartment.

The end portions of the drum extend beyond the grate compartments and are formed with bearing flanges 73, which rest rotatably on bearing rollers 74 carried by suitable stationary supports 75, whereby the grate is simply and effectively supported and may be turned with comparative ease.

Beneath the several grate compartments longitudinal ash pockets 76, with tapering bottoms, are formed in the wall of the drum, these pockets having exit openings at their deeper ends into the interior of the drum and hinged doors 77 controlled by handle rods 78 for opening and closing the same. A stationary conduit 82, provided with a door 85 to give access to the handles 79, may connect with this end of the drum, in order to carry off accumulated ash when the same is blown out by pressure within the furnace upon opening of one or more of the doors 77. In order to prevent the dust being blown out at the opposite end of the drum at such times, a diaphragm 84 may be provided, as shown in Fig. 2.

The means for turning the grate at intervals and by distances proportionate to its divisions include a suitable driving motor or source of power, indicated at 132, a driving shaft 131, and a clutch 133, 134 for connecting and disconnecting the motor with a bevel pinion 130 meshing with a gear 129 formed on the adjacent end of the grate drum. The movable member 134 of the clutch is splined on the shaft so as to be free to slide thereon, while compelled to rotate therewith, while the bevel pinion 130 is held against longitudinal movement but loose on the shaft as to rotation. The clutch may be thrown in by a manual starting lever 145, fast on a rock-shaft 142, which at its opposite end bears crank arms 141 and 144, the crank arm 141 being connected with the clutch by means of a link 140 and a bell crank 139. The other crank arm 144 is connected by a link 143 with a detent 135, which is pivotally hung on the driving shaft and formed at its lower end with an engaging portion 136 adapted to enter notches 137 in a ring 138 on the drum. The detent carries a weight 146, which causes it to engage automatically with the said notches, and the relation of the parts is such that when the detent is shifted out of holding engagement with a notch the clutch member 134 is simultaneously moved into engagement with the complementary clutch member 133, thereby coupling the grate to the motor and causing its rotation. The grate then turns for a partial revolution until the detent end 136 which has been riding upon the flange 138 drops into the next succeeding notch 137, and thereby not only positively arrests the grate but also disconnects the clutch. One side of each of the notches 137 is preferably beveled at its outer portion, as indicated at 147, the purpose of this beveling being to enable the initial portion of each movement of the grate to complete the disengagement of the detent and thereby complete the engagement of the clutch.

For the purposes of illustration the grate is shown mounted in a suitable inclosure, designated generally A, which is constructed in such manner as to provide a combustion chamber 1 at the top of the grate, a dumping chamber or ash pit 21 at the bottom of the same, and inclosed chambers $a$ and $c$ at the sides. The fresh charges may be introduced into the chamber $a$ by charging mechanism, constituting the subject-matter of a companion application, and there dried by heated gases flowing through the passages 26, 27, 28, 29, 30 and 31. In the chamber $c$ the burned charges or clinker may be cooled by the forced draft to support combustion which is supplied through a conduit 10 to an air chamber 33 and thence enters the grate compartment in cooling position, passing from the said compartment through the perforations in its grate bars into the air space 35 in the interior of the grate, where it flows through an opened valve $44^a$ into the grate compartment in burning position at the top, the other valves being closed, as represented in Fig. 1. These general features of the furnace and the combination of the grate with the casing structure and with sealing provisions such as indicated at 48, 49 and 70 so as to form separate chambers for the reception and treatment of successive charges constitute the subject matter of our prior application filed July 5, 1912, Serial Number 707,697, and are not claimed herein, the present application constituting a division relating to the grate itself and its driving mechanism as capable of embodiment in the same or modified forms in combustion apparatus of various kinds.

What we claim as new is:

1. A rotary horizontal axis grate having solid walls forming a series of compartments, grate bars therein forming receptacles, and means for opening and closing draft communication within the grate between the grate receptacles.

2. A rotary horizontal axis grate comprising a central drum, a series of separate grate compartments around the outside of the drum, said compartments adapted to be substantially non-communicating, and grate bars lining said compartments and forming receptacles for the charges.

3. A rotary horizontal axis grate having a central drum with wings projecting outward therefrom to form a series of grate compartments, and grate bars lining the walls of said compartments.

4. In a rotary horizontal axis grate, the combination of a central drum provided with wings, and receptacles constituted of grate bars mounted in the compartments thus formed.

5. A rotary grate structure, comprising a support mounted to rotate about a horizontal axis and having walls forming a series of grate compartments, and grate receptacles mounted in said compartments.

6. A rotary grate structure, comprising a support mounted to rotate about a horizontal axis and having substantially solid walls forming a series of compartments, grate receptacles mounted in said compartments, and means for opening and closing draft communication within the grate between the compartments.

7. In a grate structure, the combination of a central drum rotatable about a horizontal axis and having wings radiating therefrom to form compartments having substantially solid walls, and grate receptacles in said compartments with an air chamber between the walls of each receptacle and the walls of its compartment.

8. In a grate, a support rotatable about a horizontal axis and formed with a series of grate compartments, means for controlling the draft communication between the compartments, and receptacles for the charges mounted within said compartments and spaced from the walls thereof to afford draft passages.

9. A rotary grate structure, comprising a horizontal rotatable drum, wing walls projecting from the drum and coöperating therewith to form compartments, means for opening and closing draft communication within the grate between said compartments, and grate bars mounted in the compartments with draft spaces between themselves and the compartment bottom and side walls.

10. A rotary grate structure, comprising a support rotatable about a horizontal axis and having walls forming a series of compartments, and grate bars mounted in said compartments in such manner as to form receptacles for the charges with spaces between themselves and the walls of the compartments, the said spaces being closed at the exterior portions of the grate.

11. A rotary horizontal axis grate comprising a series of grate receptacles, and automatic means for opening and closing draft communication between the grate receptacles.

12. A rotary grate structure, comprising a rotatable drum having radiating wings forming a series of compartments, the walls of said compartments having ports therein, valves controlling said ports, and automatic means for controlling said valves in a predetermined manner according to the positions of the compartments.

13. A rotary horizontal axis grate having a series of compartments, valves for opening and closing draft communication between said compartments, rods for operating said valves, and stationary means formed to shift said rods lengthwise as the grate turns.

14. A rotary horizontal axis grate having outward projecting division walls separating a series of grate compartments from each other, grate bars lining said compartments, said division walls being provided with ports, and valves controlling said ports.

15. A grate structure, comprising a central horizontal rotatable drum having outward projecting wings constituting divisions between grate compartments, grate receptacles mounted in said compartments with draft spaces between themselves and the walls thereof, and ash pockets formed in the walls of the drum and opening into the interior thereof.

16. A grate structure comprising a central rotatable drum having outward projecting divisions and ash pockets in its walls between said divisions, and grate bars mounted in the compartments formed by the drum and its divisions with draft spaces between the bars and the walls of said compartments.

17. In a furnace, a progressive grate comprising a series of grate receptacles, and automatic valves controlling the communication between adjacent receptacles.

18. A rotary grate comprising a drum and a circular series of compartment sections carried thereby, and having ash doors opening into the interior of said drum, and a conduit for carrying off the dust from said drum.

19. A progressive grate comprising a series of box-like grate units with draft openings in their walls and an inclosed air space in the grate at the inner sides of said walls, an ash door communicating with said air space, and means for causing forced draft to pass through one of the grate units into said air space.

20. A progressive grate comprising box-like grate units with draft openings in their walls and an inclosed air space in the grate at the inner sides of said walls, in combination with means for supplying forced draft to said air space and means for automatically controlling the distribution of draft therein.

21. A progressive grate comprising a series of grate units with draft openings therein, and inclosed air chambers beneath the several grate units, in combination with automatic valves controlling the communication between said air chambers.

22. The combination with a progressive step-by-step forward-traveling grate comprising a series of divisions, of a motor for driving the same, a clutch interposed between the motor and the grate, and means for automatically throwing out the clutch after a predetermined movement of the grate proportional to the divisions.

23. The combination with a progressive grate, of a motor for driving the same, a clutch interposed between the motor and the grate, a detent adapted to engage automatically with the grate after a predetermined movement, and connections whereby the engagement of the detent throws out the clutch.

24. The combination with a progressive grate, of a motor for driving the same, a clutch interposed between the motor and the grate, a detent adapted to engage automatically with the grate after a predetermined movement, connections whereby the engagement of the detent throws out the clutch, means for throwing in the clutch and disengaging the detent at will, and means on the grate operative upon the detent to complete the engagement of the clutch when the grate is started.

25. The combination of a rotary grate, a circular way on said grate having a series of notches and inclined portions thereat, grate driving means, a clutch for connecting and disconnecting the grate and driving means, a detent connected to said clutch and adapted to ride on said way so as to hold the clutch in and by dropping into said notches to cause the clutch to become disconnected, and means for throwing the clutch in, said inclined portions of the way acting on the detent serving to complete the movement of the clutch.

THOMAS W. ATTERBURY.
PERCY W. MATTHEWS.

Copies of this patent may be obtained for five cents each, by addressing the "Commissioner of Patents Washington, D C."